2,849,312
METHOD OF ALIGNING MAGNETIC PARTICLES IN A NON-MAGNETIC MATRIX

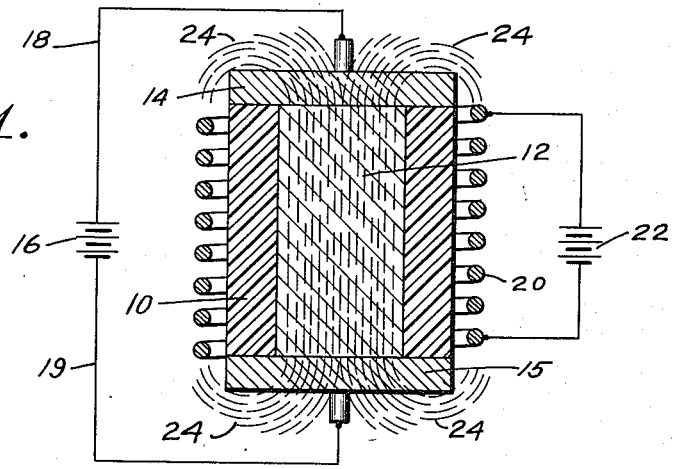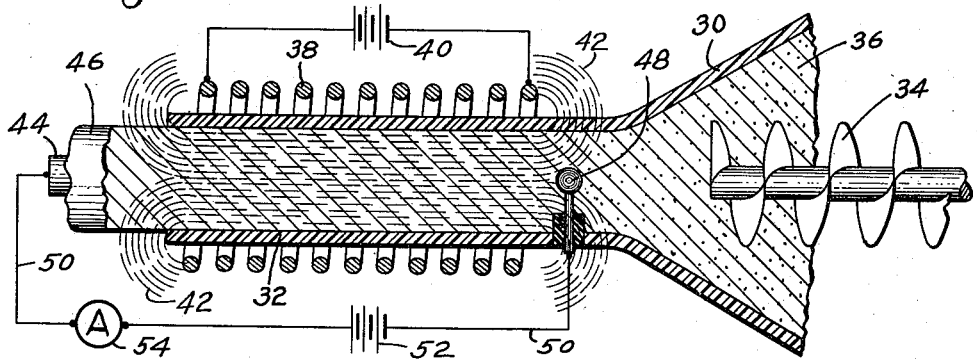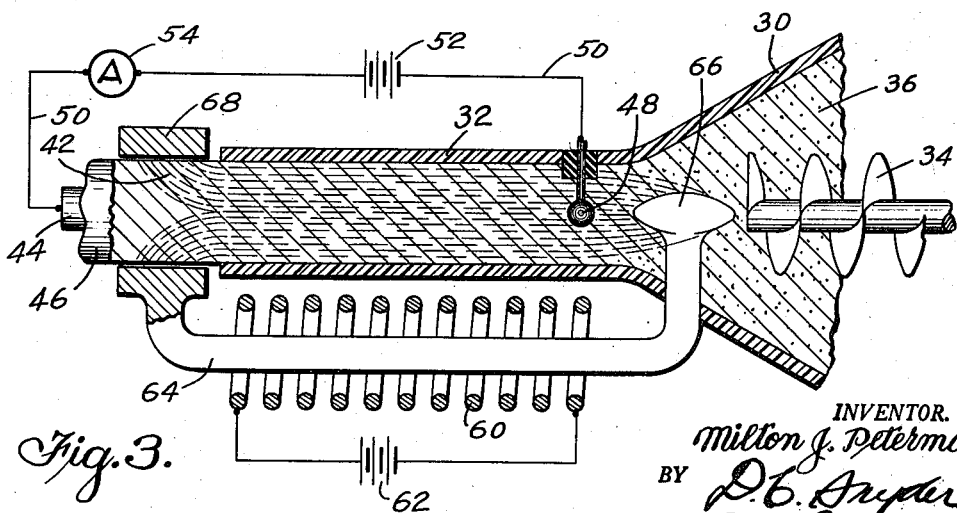

Milton J. Peterman, Los Angeles, Calif.

Application February 1, 1954, Serial No. 407,618

3 Claims. (Cl. 75—201)

(Granted under Title 35, U. S. Code (1952), sec. 266)

The invention described herein may be manufactured and used by or for the Government of the United States of America for governmental purposes without the payment of any royalties thereon or therefor.

This invention relates to a composition of matter made up of particles of iron or other paramagnetic material embedded in a plastic matrix, the particles being aligned and oriented within the matrix. The invention also relates to a method of and apparatus for producing such composition of matter.

The method of the present invention comprehends the mixing of particles of paramagnetic material with a plastic in liquid form, subjecting the resulting mixture to a magnetic field to orient said particles, and causing the plastic to harden to thereby produce a solid having stable magnetic and electrical properties. If desired, the effect of the magnetic field may be supplemented by simultaneously passing an electric current through the mixture while the plastic is yet unhardened, to weld the individual particles together and thus assure good electrical conductivity.

An object of the invention is to provide an improved composition of the type indicated, and an improved method and apparatus for producing the same.

Other objects and many of the attendant advantages of this invention will be readily appreciated as the same becomes better understood by reference to the following description.

Fig. 1 is a view in longitudinal section showing a cylinder of material formed of a composition of matter which embodies the invention, and apparatus for producing said cylinder;

Fig. 2 is a similar view showing a modified form of apparatus and method; and

Fig. 3 is a similar view showing a further modified form of apparatus and method.

Referring to Fig. 1, the apparatus comprises a mold formed of a hollow cylinder 10 of insulating material designed to receive a mass 12 of unpolymerized liquid plastic having mixed therewith iron filings or other finely divided paramagnetic particles. The cylinder 10 is provided with cover plates 14, 15 of conducting material; current may be passed through them and through the mixture from a source 16 connected to the cover plates by leads 18, 19 to weld or sinter the particles of paramagnetic material to each other in stable relation after they have been aligned by means of the apparatus now to be described.

A magnetic field is produced by means such as a coil 20 supplied from a source 22 of direct current, producing a magnetic field which is represented by the lines of force 24, to orient the particles and cause them to form themselves into chains. If, while the two currents are flowing, the plastic is caused to polymerize, as by heating, or by the previous addition of a catalyst to the mixture, the particles will be permanently held in the position to which they have been brought.

The apparatus shown in Fig. 2 is designed to produce a continuous rod of material by extrusion, and includes a hopper 30 which merges with a tubular extrusion die 32, with a screw 34 or other device to agitate the mixture 36 and force it through the die. An induction coil 38 surrounds the die and is supplied with direct current from a source 40, to produce the magnetic field indicated by the lines of force 42. Preferably the hopper 30 and die 32 are of diamagnetic material in order that the strength of the magnetic field may be at maximum.

A movable electrode 44 is secured to the forward end of the mass 46 being extruded, and a second electrode 48 projects into the mass at the entrance to the die. The two electrodes are connected by leads 50 in which are connected a source of direct current 52 and an ammeter 54.

The apparatus shown in Fig. 3 is similar to that shown in Fig. 2, and the parts are designated by the same reference numerals, except as hereinafter indicated. In Fig. 3, the field-inducing coil is replaced by an electromagnet comprising a core 64 and a coil 60 energized by a source 62. The core 64 has one pole 66 projecting into the mixture at the entrance of the die, and its other pole 68 in the form of a collar surrounding the extruded mass.

In the operation of the two forms of apparatus shown in Figs. 2 and 3, a mixture of paramagnetic particles and unpolymerized liquid plastic, with addition of catalyst if desired, is placed in the hopper 36, whence it is forced by screw 34 into the die 32. The electrical circuits being closed, magnetic flux will pass longitudinally through the mass, aligning the paramagnetic particles into chains, while electric current will flow through the mass between electrodes 44 and 48, welding or sintering adjacent particles into stable relation to each other and also tending to heat the mass. Due to the effect of the catalyst, or the heating, or both, the mass 46 will emerge from the die in the form of a solid in which the respective positions of the particles will be permanently fixed.

It will be apparent that the plastic material used may be a mixture of rubber and sulfur which, even when extruded, will be resilient and flexible. It will also be apparent that the finished material will be a conductor which is selectively directional with reference to its geometric axis. The method may if desired be used with non-magnetic matrices to construct selective magnetic and conducting paths. The method may be closely controlled to produce a composition of any desired resistance properties. The extruded and hardened mass may be cut into laminae to be used in transformers or other electrical apparatus, to minimize eddy currents.

Obviously many modifications and variations of the present invention are possible in the light of the above teachings. It is therefore to be understood that within the scope of the appended claims the invention may be practiced otherwise than as specifically described.

What is claimed is:

1. Method of aligning magnetic material in a non-magnetic matrix comprising mixing together finely divided magnetic material with non-magnetic material in a liquid state, applying a magnetic field to the mixture to orient said magnetic material, and solidifying said non-magnetic material while retaining the orientation of said magnetic material.

2. Method of producing a selectively conductive material, comprising mixing paramagnetic particles with liquid plastic, extruding the resulting mass while subjecting it to a magnetic field to orient said particles relative to the axis of extrusion and while passing an electric current longitudinally thereof, and causing solidification of the mass while the particles are so oriented.

3. Method of producing a solid having stable magnetic and electric properties, comprising introducing paramagnetic particles into a matrix of liquid plastic, extruding the resulting mass while subjecting it to an axial magnetic field to orient said particles, and solidifying the plastic while the particles are so oriented.

References Cited in the file of this patent

UNITED STATES PATENTS

| | | |
|---|---|---|
| 2,384,215 | Toulmin | Sept. 4, 1945 |
| 2,431,095 | Tucker | Nov. 18, 1947 |
| 2,593,943 | Wainer | Apr. 22, 1952 |
| 2,597,237 | Friend | May 20, 1952 |
| 2,691,814 | Tait | Oct. 19, 1954 |
| 2,783,208 | Katz | Feb. 26, 1957 |